(12) United States Patent
Steller

(10) Patent No.: US 8,511,411 B2
(45) Date of Patent: Aug. 20, 2013

(54) COOLING MODULE FOR MOTOR VEHICLES AND MOTOR VEHICLE

(75) Inventor: Claus Steller, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 13/049,347

(22) Filed: Mar. 16, 2011

(65) Prior Publication Data

US 2011/0226542 A1 Sep. 22, 2011

(30) Foreign Application Priority Data

Mar. 16, 2010 (DE) .......................... 10 2010 011 495

(51) Int. Cl.
*B60K 11/00* (2006.01)

(52) U.S. Cl.
USPC .............. 180/68.1; 180/68.4; 165/67; 165/41

(58) Field of Classification Search
USPC ................. 180/68.1, 68.4; 165/41, 67, 140
See application file for complete search history.

(56) References Cited

U.S. PATENT DOCUMENTS

| | | | | |
|---|---|---|---|---|
| 5,409,288 | A * | 4/1995 | Masuda | 296/193.09 |
| 6,073,594 | A | 6/2000 | Tsukiana et al. | |
| 6,364,403 | B1 | 4/2002 | Ozawa et al. | |
| 2004/0250988 | A1 | 12/2004 | Machanek | |
| 2008/0185124 | A1* | 8/2008 | Rasset et al. | 165/77 |
| 2008/0231084 | A1 | 9/2008 | Mishima | |
| 2010/0078149 | A1 | 4/2010 | Yoshimitsu et al. | |
| 2011/0000728 | A1 | 1/2011 | Mildner | |

FOREIGN PATENT DOCUMENTS

| | | |
|---|---|---|
| DE | 10322211 A1 | 12/2004 |
| DE | 102004002154 A1 | 8/2005 |
| DE | 102004003197 A1 | 8/2005 |
| DE | 102009023189 A1 | 12/2010 |
| DE | 102009031746 A1 | 1/2011 |
| EP | 0896138 A2 | 2/1999 |
| EP | 2080690 A1 | 7/2009 |
| EP | 2098400 A2 | 9/2009 |
| JP | 2006082570 A | 3/2006 |
| JP | 2006256461 A | 9/2006 |
| JP | 2008037177 A | 2/2008 |
| JP | 2008273244 A | 11/2008 |
| WO | 03026908 A1 | 4/2003 |

OTHER PUBLICATIONS

British Patent Office, British Search Report for Application No. 1104142.3, dated Jul. 5, 2011.
German Patent Office, German Search Report for German Application No. 102010011495.2, Feb. 9, 2011.

* cited by examiner

*Primary Examiner* — J. Allen Shriver, II
*Assistant Examiner* — Erez Gurari
(74) *Attorney, Agent, or Firm* — Ingrassia Fisher & Lorenz, P.C.

(57) ABSTRACT

A cooling module is provided for motor vehicles with a plurality of modular elements. At least one first modular element is provided for the arrangement in a deformation region of the motor vehicle and at least one second modular element is also arranged. The at least one first modular element is displaceable relative to the at least one second modular element.

12 Claims, 2 Drawing Sheets

COOLING MODULE FOR MOTOR VEHICLES AND MOTOR VEHICLE

CROSS-REFERENCE TO RELATED APPLICATION

This application claims priority to German Patent Application No. 102010011495.2, filed Mar. 16, 2010, which is incorporated herein by reference in its entirety.

TECHNICAL FIELD

The technical field relates to a cooling module for motor vehicles as well as a motor vehicle with a corresponding cooling module. The cooling module includes, but is not limited to multiple modular elements of which at least one is provided for arrangement in a deformation region of the motor vehicle.

BACKGROUND

Cooling modules of the type mentioned at the outset are being installed in almost all motor vehicles operated with internal combustion engines. In the case of front-mounted engines, the cooling modules are usually arranged in the front-end region of the engine compartment, in the case of rear-mounted engines in the back-end region of the engine compartment, in the case of mid-engines also laterally. Particularly in the case of front and rear-mounted engines the cooling modules are thus arranged in a deformation region which serves to absorb energy that has to be dissipated in the event of a collision of the motor vehicle. Because corresponding cooling modules are regularly arranged very closely adjacent to bumpers of cross members, these are frequently damaged even upon a collision at low speed. Upon the repair of a motor vehicle with such minor damage the entire cooling module has to be frequently replaced, which can produce high repair expenditure.

From U.S. Pat. No. 6,364,403 a motor vehicle front structure with at least one radiator having an upper projection, which is inserted in a motor vehicle member in an insertion clearance and a lower projection, which is inserted in a lower member structure in a clearance, is known. Through the introduction of an external force that exceeds a predetermined value the connection to the upper member structure is cancelled; the connection to the lower member structure remains intact. Because of this, the radiator pivots about the lower mounting in the event of the introduction of external forces. However, the known solution cannot prevent that in the case of a damage of parts of the radiator that cannot be excluded the entire cooling module has to be replaced.

In view of the foregoing, at least one object is to at least partially overcome the disadvantages resulting from the prior art and more preferably state a radiator module which in the event of a damage through the action of external forces can be more cost-effectively repaired than known radiator modules. In addition, other objects, desirable features and characteristics will become apparent from the subsequent summary and detailed description, and the appended claims, taken in conjunction with the accompanying drawings and this background.

SUMMARY

A cooling module according to an embodiment of the invention comprises a plurality of modular elements, at least one first modular element and at least one second modular element. The at least one first modular element is provided for arrangement in a deformation region of the motor vehicle. The deformation region serves for the dissipation of energy upon the action of external forces on the motor vehicle or of dynamic energy of the motor vehicle proper.

At least one first modular element is displaceable with respect to the at least one second modular element. In the event that the deformation region of the motor vehicle is required for the dissipation of energy or absorption of forces, the first modular element can thus be displaced relative to the second modular element, as a result of which a damage of the second modular element up to a certain limit can be avoided. During the repair of the motor vehicle the replacement can thus be limited to the at least one first modular element which lowers the repair costs.

According to a further embodiment it can be provided that the at least one first modular element comprises a radiator and/or a condenser of an air conditioner. If in a motor vehicle an air conditioner is provided which requires a condenser, the latter is usually arranged adjacent to the radiator since both have relatively large surfaces. Radiator and condenser are thus frequently arranged in a deformation region. In addition to this, such modular elements frequently have fine structures for example fin structures that can be easily damaged so that radiator and condenser can no longer fulfill their function following a collision.

According to an additional embodiment it can be provided that the at least one second modular element is a charge air cooler. Such charge air coolers are used for turbo engines in order to achieve a higher output through a higher oxygen density in the combustion air. Such charge air coolers are frequently arranged in a lower region of the motor vehicle and mostly below the radiator.

According to an additional embodiment it can be provided that the at least one first modular element comprises a condenser of an air conditioner and that the at least one second modular element is an engine radiator. This reduces the repair costs in the event of a repair.

According to an additional embodiment a fan is additionally arranged, which serves to increase the cooling capacity. Fans are also relatively large in surface and thus frequently arranged in a deformation region of a motor vehicle, particularly since this serves for providing a flow for radiator and/or condenser.

According to an additional embodiment it can be provided that the at least one first modular element and the at least one second modular element are mounted in a frame. This allows a pre-assembly of the cooling module and insertion of the pre-assembled cooling module in the motor vehicle.

According to an additional embodiment it can be provided that the frame is divisible. The at least one first modular element is mounted in a first part of the frame and the at least one second modular element in a second part of the frame. The divisibility of the frame causes the frame to be divided into the first and into the second part in the event of the deformation in order to support the displaceability of the at least one first modular element to the at least one second modular element.

According to an additional embodiment it can be provided that the first part and the second part of the frame are interconnected positively, non-positively and/or materially. For a non-positive connection, clamping together of the first frame part and the second frame part is possible. A material connection can be achieved through gluing or welding, wherein the material connection at a force greater than a predetermined limit force, breaks open.

A positive connection, according to an additional embodiment can be achieved through clipping the first and the second frame part together. The clips can be designed so that these are destroyed during the vehicle deformation, while these can then be preferably replaced but they can also be designed in such a manner that they permit a non-destructive division of the frame, for example by way of actuation bevels arranged on flexible latching projections. Alternatively or additionally to this the frame can have a predetermined breaking point which breaks in the event of a deformation. Predetermined breaking points can be introduced during the production of the frame and can thus be produced cost-effectively.

An additional further embodiment can provide that the connection of the first part of the frame and the second part of the frame or the predetermined breaking point is provided on lateral braces of the frame substantially running vertically. This makes possible an arrangement of the at least one first cooling element and of the at least one second cooling element below one another.

A motor vehicle is provided with a cooling module according to the foregoing embodiments. In the event that the deformation region was deformed for the absorption of energy such a motor vehicle can be cost-effectively repaired with respect to the replacement of possibly damaged modular elements of the cooling module.

According to a first embodiment of the motor vehicle it can be provided that adjacent to the at least one first modular element a bumper structure or a cross member structure of the motor vehicle is arranged. Adjacent in terms of this further development means spaced from each other in such a manner that a deformation of the bumper structure or the cross member structure brings about an entering of the bumper structure or member structure into the region of the at least one first modular element. With the help of this further development it can be achieved that the first modular element which is displaceable relative to the second modular element in the event of a deformation of the bumper structure or of the cross member structure is displaced relative to the at least one second modular element, as a result of which the advantage according to the invention of protecting the at least one second modular element in the event of deformation can be achieved.

According to an additional embodiment it can be provided that in displacement direction of the at least one first modular element relative to the at least one second modular element a clearance is provided behind the at least one first modular element or behind the fan. Thus it can be achieved that for the at least one first modular element and/or the fan an adequate displacement space is available.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
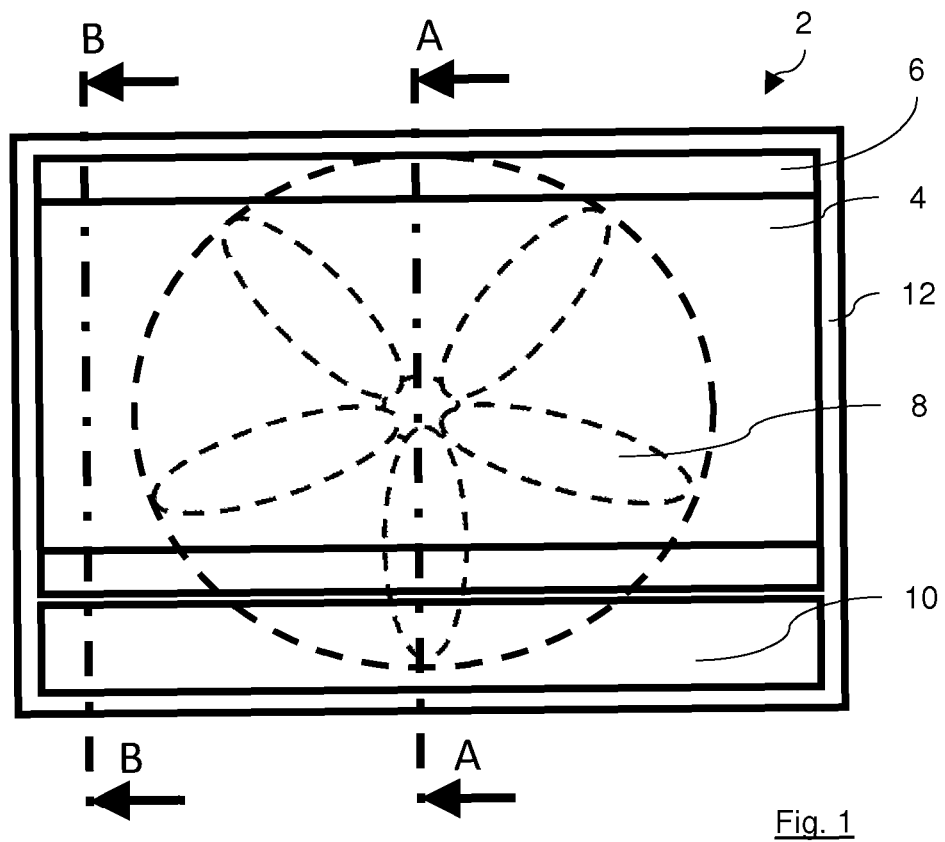
FIG. 1 is a cooling module according to an embodiment in a front view.

FIG. 1 shows a front view of a cooling module 2 according to an embodiment, which is provided for a front-mounted engine of a motor vehicle from a viewing direction opposing the driving direction of the motor vehicle. The cooling module 2 comprises a condenser 4 of an air conditioner of the motor vehicle as first modular element. Behind the condenser 4 a radiator 6 having a small spacing to the condenser 4 is arranged. In driving direction behind this, a fan 8 drawn in interrupted line is provided, which serves for increasing the cooling capacity of the radiator 6 and the condensation capacity of the condenser 4.

Below condenser 4, radiator 6 and fan 8 a charge air cooler 10 is arranged, which serves for a turbo or a compressor or another element compressing the combustion air to increase the oxygen density of the combustion air. Condenser 4, radiator 6, fan 8 and charge air cooler 10 are mounted in a frame 12, which in turn can be mounted as preassembled module in the motor vehicle. In the exemplary embodiment shown the frame 12 consists of an upper frame part 12.1 and a lower frame part 12.2 which are interconnected. Details in this regard are explained in connection with FIG. 2c. In the event of a deformation of the motor vehicle the frame parts 12.1 and 12.2 separate from each other. Alternatively a version can be mooted in which the frame is constructed of lateral braces without upper cross bracing. Condenser 4, radiator 6 and fan 8 are mounted in the upper frame part 12.1, the charge air cooler 10 is mounted in the lower frame part 12.2.

Figure 2A:
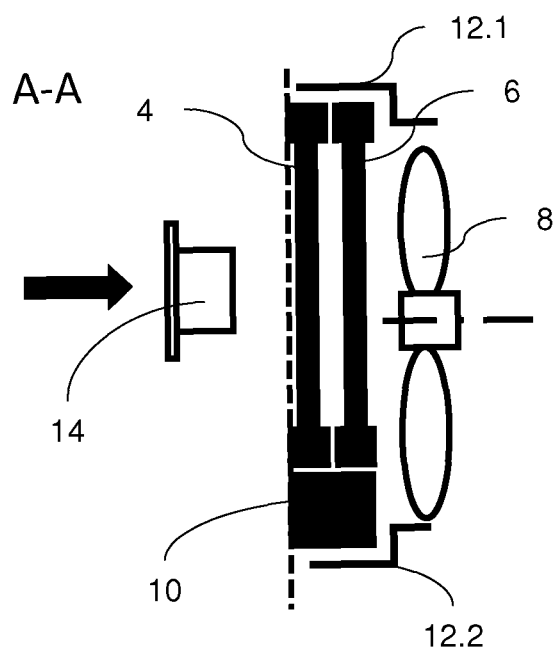
FIG. 2a is a section through the cooling module according to the embodiment with the section line A-A according to FIG. 1.

FIG. 2a shows a sectional representation through the cooling module 2 with the section line A-A from FIG. 1. At the same height with the condenser 4, the radiator 6 and the fan 8 a bumper brace 14 is arranged adjacent to the condenser 4. At the height of the charge air cooler 10 no bumper brace is arranged.

Figures 2B, 3:
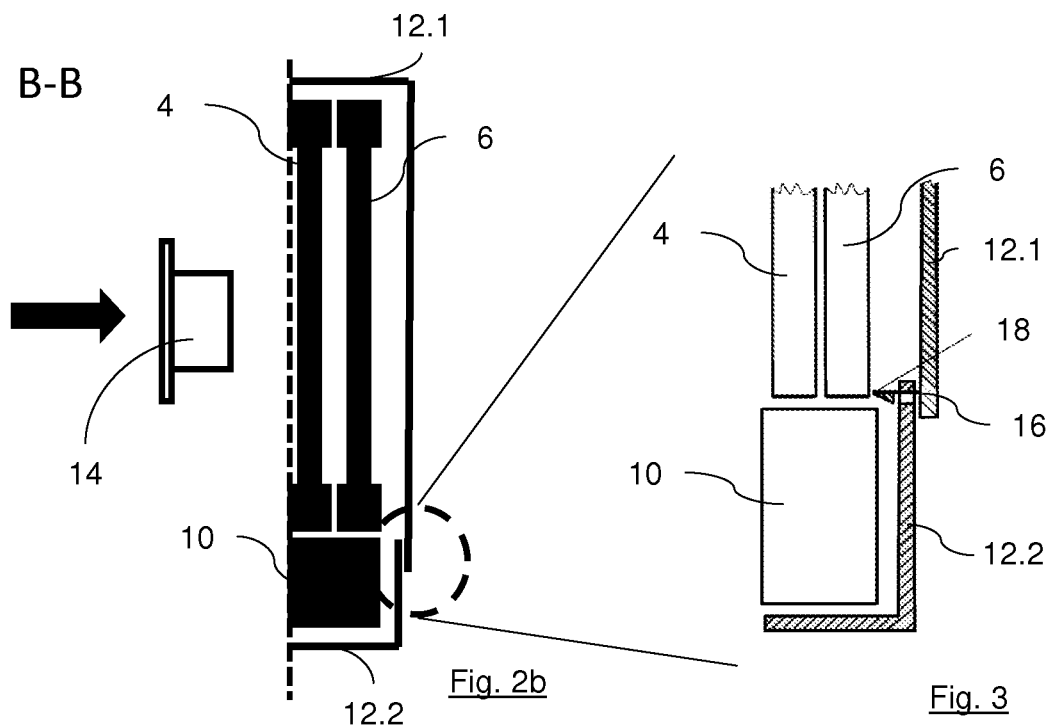
FIG. 2b is a section through the cooling module according to the embodiment with the section line B-B from FIG. 1.
FIG. 3 is an enlarged representation of a detail from FIG. 2b.

FIG. 2b shows a section through the cooling module 2 in accordance with the section line B-B from FIG. 1. The frame 12 comprises a fastening region on which the first frame part 12.1 is fastened to the second frame part 12.2.

As shown in FIG. 3 a hole 16 is provided to this end on the second frame part 12.2 through which a clip 18 fastened to the first frame part 12.1 engages and establishes a latching connection of the first frame part 12.1 and the second frame part 12.2. The clip 18 is designed in such a manner that it is destroyed at a predetermined force and the connection between first frame part 12.1 and second frame part 12.2 is cancelled.

Figure 2C:
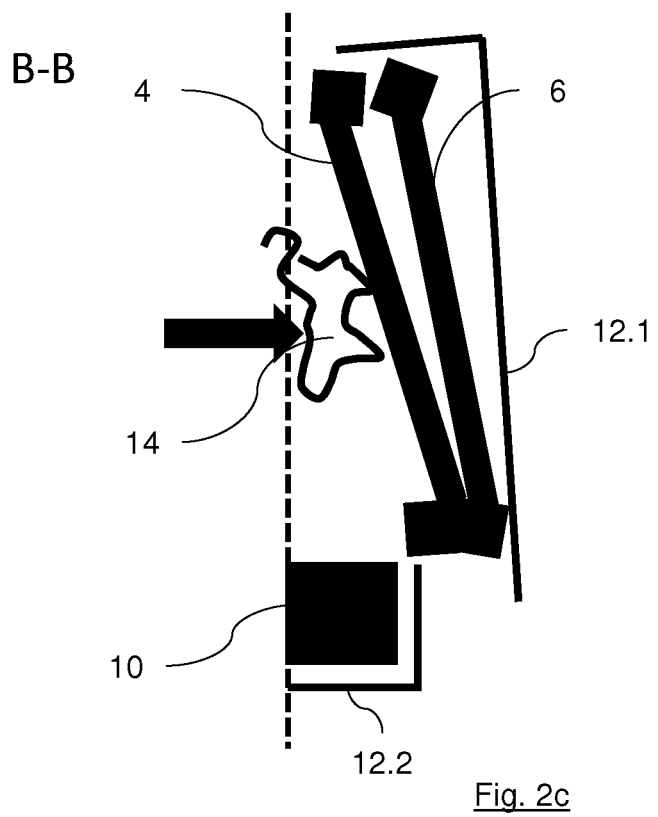
FIG. 2c is the cooling module according to the embodiment with the section line B-B from FIG. 1 after a deformation.

As shown in FIG. 2c the bumper beam 14 in the event of a deformation is displaced backwards against the driving direction and in the process comes in contact with the condenser 4. The force exerted in the process on the condenser 4 is directed via the frame 12.1 and in the process results in a release of the connection of frame part 12.1 to 12.2 as a result of which a displacement of condenser 4 and radiator 6 relative to the charge air cooler 10 is possible.

During the repair of the motor vehicle it is possible to separately repair or replace the components of the cooling module 2, condenser 4, radiator 6, fan 8 as well as first frame part 12.1 arranged in the region of the bumper brace. The charge air cooler 10 and the second frame part 12.2 can be used further without repair if applicable.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A cooling module for a motor vehicle, comprising:
   a plurality of modular elements;
   at least one first modular element of the plurality of modular elements configured for an arrangement in a deformation region of the motor vehicle;
   at least one second modular element configured for arrangement in the deformation region of the motor vehicle;
   a frame including a first part and a second part, with the at least one first modular element mounted in the first part of the frame and the at least one second modular element mounted in the second part of the frame, and
   wherein the at least one first modular element is displaceable relative to the at least one second modular element and the first part of the frame and the second part of the frame are interconnected non-positively.

2. The cooling module according to claim 1, wherein the at least one first modular element comprises a radiator of an air conditioner.

3. The cooling module according to claim 1, wherein the at least one first modular element comprises a condenser of an air conditioner.

4. The cooling module according to claim 1, wherein the at least one second modular element is a charge air cooler.

5. The cooling module according to claim 3, wherein the at least one second modular element is an engine radiator.

6. A cooling module for a motor vehicle, comprising:
   a plurality of modular elements;
   at least one first modular element of the plurality of modular elements configured for an arrangement in a deformation region of the motor vehicle;
   at least one second modular element configured for arrangement in the deformation region of the motor vehicle;
   a frame including a first part and a second part, with the at least one first modular element mounted in the first part of the frame and the at least one second modular element mounted in the second part of the frame; and
   a clip configured to clip the first part of the frame to the second part of the frame,
   wherein the at least one first modular element is displaceable relative to the at least one second modular element.

7. The cooling module according to claim 2, wherein the frame has a predetermined breaking point.

8. A motor vehicle, comprising:
   a cooling module, the cooling module comprising:
      a plurality of modular elements;
      at least one first modular element of the plurality of modular elements configured for an arrangement in a deformation region of the motor vehicle;
      at least one second modular element configured for arrangement in the deformation region of the motor vehicle; and
      a frame including a first part and a second part, with the at least one first modular element mounted in the first part of the frame and the at least one second modular element mounted in the second part of the frame,
      wherein the at least one first modular element is displaceable relative to the at least one second modular element and the first part of the frame and the second part of the frame are interconnected materially.

9. The motor vehicle according to claim 8, further comprising a bumper structure adjacent to the at least one first modular element.

10. The motor vehicle according to claim 8, wherein adjacent to the at least one first modular element a bumper structure or a cross member structure is arranged.

11. The motor vehicle according to claim 8, further comprising a clear space in a displacement direction behind the at least one first modular element.

12. The motor vehicle according to claim 8, further comprising a clear space in a displacement direction behind a fan.

* * * * *